US012603369B2

(12) United States Patent
Lee

(10) Patent No.: US 12,603,369 B2
(45) Date of Patent: Apr. 14, 2026

(54) BATTERY MODULE

(71) Applicant: James Cheng Lee, La Habra, CA (US)

(72) Inventor: James Cheng Lee, La Habra, CA (US)

( * ) Notice: Subject to any disclaimer, the term of this patent is extended or adjusted under 35 U.S.C. 154(b) by 645 days.

(21) Appl. No.: 18/097,364

(22) Filed: Jan. 16, 2023

(65) Prior Publication Data

US 2023/0387527 A1 Nov. 30, 2023

Related U.S. Application Data

(60) Provisional application No. 63/345,031, filed on May 24, 2022.

(51) Int. Cl.
| | |
|---|---|
| *H01M 50/204* | (2021.01) |
| *H01M 50/244* | (2021.01) |
| *H01M 50/502* | (2021.01) |
| *H01M 50/507* | (2021.01) |
| *H01M 50/569* | (2021.01) |
| *H01M 4/02* | (2006.01) |

(52) U.S. Cl.
CPC ....... *H01M 50/204* (2021.01); *H01M 50/244* (2021.01); *H01M 50/502* (2021.01); *H01M 50/507* (2021.01); *H01M 50/569* (2021.01); *H01M 2004/027* (2013.01); *H01M 2004/028* (2013.01)

(58) Field of Classification Search
CPC .. H01M 10/482; H01M 50/20; H01M 50/204; H01M 50/244; H01M 50/502; H01M 50/507; H01M 50/569; H01M 2004/027; H01M 2004/028; Y02E 60/10
See application file for complete search history.

(56) References Cited

U.S. PATENT DOCUMENTS

| | | | | |
|---|---|---|---|---|
| 2003/0108786 A1* | 6/2003 | Aaltonen | ............ | H01M 50/588 |
| | | | | 429/61 |
| 2007/0059591 A1* | 3/2007 | Sharrow | ............. | H01M 50/574 |
| | | | | 200/570 |
| 2011/0097620 A1* | 4/2011 | Kim | ................. | H01M 10/4207 |
| | | | | 174/68.2 |

(Continued)

FOREIGN PATENT DOCUMENTS

| | | | |
|---|---|---|---|
| CN | 208460847 U | * | 2/2019 |

OTHER PUBLICATIONS

"Zhu et al., CN 208460847 U—Machine Translated, Feb. 1, 2019" (Year: 2019).*

*Primary Examiner* — Tong Guo
*Assistant Examiner* — Jesse J Efymow

(57) ABSTRACT

A battery module includes a plurality of batteries, an upper cover covered on the plurality of the batteries, a plurality of bus-bars, a plurality of detection lines, a plurality of insulating rivets, and a plurality of wirings connected between the plurality of the batteries and the plurality of the bus-bars. A top of the upper cover has a plurality of first mounting areas. Each first mounting area has a mounting portion and two location holes. Each bus-bar is disposed on the mounting portion of one first mounting area. Each bus-bar has a main portion. The main portion has two hooking portions and a plurality of fastening holes. The two hooking portions are inserted into the two location holes. One ends of the plurality of the detection lines are fastened to the plurality of the fastening holes by the plurality of the insulating rivets.

14 Claims, 11 Drawing Sheets

(56)            References Cited

U.S. PATENT DOCUMENTS

| | | | | |
|---|---|---|---|---|
| 2014/0356668 A1* | 12/2014 | Kim | .................... | H01M 50/553 |
| | | | | 429/90 |
| 2015/0333304 A1* | 11/2015 | Sekine | ............. | H01M 10/6555 |
| | | | | 429/153 |
| 2018/0090920 A1* | 3/2018 | Shoji | .................... | H01M 50/51 |
| 2019/0081370 A1* | 3/2019 | Capati | ................ | H01M 10/425 |
| 2022/0255141 A1* | 8/2022 | Li | ....................... | H01M 10/425 |

* cited by examiner

200

51

51

5

BATTERY MODULE

BACKGROUND OF THE INVENTION

1. Field of the Invention

The present invention generally relates to a battery module, and more particularly to a battery module which is capable of reducing a short circuit risk and increasing an open circuit safety.

2. The Related Art

In an assembly of a battery system and a series-parallel connection of batteries on a market, soldering ways or metal screw locking ways are mostly used as fixing and joining ways of the battery system and the batteries. However, if the metal screw locking way is used in the assembly of the battery system, a short circuit risk may be caused by an artificial negligence of metal screws or falling the metal screws. And if the battery is overloaded in a soldering technology, the battery is unable be disconnected in time, consequently, various hazards are caused.

Thus, it is essential to provide an innovative battery module which is capable of reducing a short circuit risk and increasing an open circuit safety.

SUMMARY OF THE INVENTION

An object of the present invention is to provide a battery module. The battery module includes a plurality of batteries, an upper cover, a plurality of bus-bars, a plurality of detection lines, a plurality of insulating rivets and a plurality of wirings. The upper cover is covered on the plurality of the batteries. A top of the upper cover has a plurality of first mounting areas. Each first mounting area has a mounting portion and two location holes. Two middles of two sides of the mounting portion of each first mounting area form the two location holes. Each bus-bar is disposed on the mounting portion of one first mounting area of the upper cover. Each bus-bar has a main portion. The main portion has two hooking portions and a plurality of fastening holes. Two opposite sides of an upper part of the main portion extend downward to form the two hooking portions, respectively. The two hooking portions are inserted into the two location holes. The upper part of the main portion defines the plurality of the fastening holes penetrating through a top surface and a bottom surface of the upper part of the main portion. The plurality of the detection lines are disposed on a top surface of the upper cover. One ends of the plurality of the detection lines are corresponding to the plurality of the fastening holes of the main portions of the plurality of the bus-bars. The one ends of the plurality of the detection lines are fastened to the plurality of the fastening holes of the main portions of the plurality of the bus-bars by the plurality of the insulating rivets. The plurality of the wirings are connected between the plurality of the batteries and the plurality of the bus-bars.

Another object of the present invention is to provide a battery module. The battery module includes a plurality of batteries, an upper cover, a plurality of bus-bars, a plurality of detection lines, a plurality of insulating rivets and a plurality of wirings. Two opposite sides of a top surface of each battery are equipped with a positive electrode and a negative electrode, respectively. The upper cover is covered on the plurality of the batteries. The upper cover has a plurality of blocking walls. The plurality of the blocking walls surround a plurality of first mounting areas and two second mounting areas. Two lateral blocking walls are opposite to each other. Two inner surfaces of the two lateral blocking walls extend towards each other to form two protrusions. A top surface of each protrusion is recessed inward to form a location hole. A top surface of each of the plurality of the first mounting areas and the two second mounting areas protrudes upward to form a rib. The rib is transversely connected between the two protrusions. Each first mounting area has two first perforations vertically penetrating through each first mounting area. Each second mounting area has one first perforation vertically penetrating through each second mounting area. The first perforations of the plurality of the first mounting areas are corresponding to the positive electrodes and the negative electrodes of the plurality of the batteries. The first perforations of the two second mounting areas are corresponding to one positive electrode and one negative electrode of two batteries. The plurality of the bus-bars are disposed in the plurality of the mounting portions. Each bus-bar has a main portion. The plurality of the bus-bars include a plurality of first bus-bars and two second bus-bars. The two second bus-bars are located at a middle of a front end of the plurality of the bus-bars. Other bus-bars are defined as the plurality of the first bus-bars. Each first bus-bar has two wings. Two opposite ends of the main portion oppositely extend outward to form the two wings. The main portion defines a plurality of fastening holes penetrating through a top surface and a bottom surface of an upper part of the main portion. Two opposite sides of the upper part of the main portion extend downward to form two hooking portions, respectively. The two hooking portions are inserted into the two location holes of the two protrusions. The main portions of the plurality of the bus-bars are disposed on the ribs of the upper cover. The two wings of each first bus-bar are disposed in one first mounting area. The two wings define two second perforations penetrating through top surfaces and bottom surfaces of the two wings, respectively. The two second perforations of each first bus-bar are corresponding to the two first perforations of the one first mounting area. The two second perforations of each first bus-bar are corresponding to the positive electrode and the negative electrode of one battery, respectively. Each second bus-bar has one wing. The one wing of each second bus-bar has one second perforation. The one second perforation of each second bus-bar is corresponding to the one first perforation of one second mounting area. The plurality of the detection lines are disposed on a top surface of the upper cover. One ends of the plurality of the detection lines are corresponding to the plurality of the fastening holes of the main portions of the plurality of the bus-bars. The one ends of the plurality of the detection lines are fastened to the plurality of the fastening holes of the main portions of the plurality of the bus-bars by the plurality of the insulating rivets. The plurality of the wirings are connected among the positive electrodes, the negative electrodes of the plurality of the batteries and the plurality of the bus-bars.

Another object of the present invention is to provide a battery module assembled in a shell. The battery module includes a plurality of batteries, an upper cover, a plurality of bus-bars, a plurality of detection lines, a plurality of insulating rivets and a plurality of wirings. Two opposite sides of a top surface of each battery are equipped with a positive electrode and a negative electrode, respectively. The upper cover is covered on the plurality of the batteries. The upper cover has a plurality of blocking walls, and a plurality of mounting portions surrounded among the plurality of the blocking walls. Each mounting portion has at least one first perforation. Two lateral blocking walls are opposite to each other. Two inner surfaces of the two lateral blocking walls extend towards each other to form two protrusions. Two sides of a top surface of each mounting portion protrude upward to form the two protrusions. A top surface of each protrusion is recessed inward to form a location hole. A middle of the top surface of the mounting portion protrudes upward to form a rib. The rib is transversely connected between the two protrusions. Two mounting portions have two first perforations vertically penetrating through the two mounting portions. The first perforations of the plurality of the mounting portions are corresponding to the positive electrodes and the negative electrodes of the plurality of the batteries. The plurality of the bus-bars are disposed in the plurality of the mounting portions. Each bus-bar has a main portion. The plurality of the bus-bars include a plurality of first bus-bars and two second bus-bars. The two second bus-bars are located at a middle of a front end of the plurality of the bus-bars. Other bus-bars are defined as the plurality of the first bus-bars. The two second bus-bars have two main portions, two wings and two connecting portions. One end of the main portion of each of the two second bus-bars extends outward to form one wing. The other end of the main portion of each of the two second bus-bars extends outward to form one connecting portion. The main portion of each of the two second bus-bars has two hooking portions and a plurality of fastening holes. Two opposite sides of an upper part of the main portion of each of the two second bus-bars extend downward to form the two hooking portions, respectively. Each fastening hole penetrates through a top surface and a bottom surface of the upper part of the main portion of one second bus-bar. The two hooking portions are fastened into the two location holes of the two protrusions of the upper cover. The main portion of each of the two second bus-bars is disposed on the rib of the upper cover. The wing of each of the two second bus-bars is mounted in one mounting portion. The connecting portion extends beyond a front end of the upper cover. The two connecting portions of the two second bus-bars are electrically connected with two connectors of the shell. The one wing of each of the two second bus-bars has one second perforation penetrating through a top surface and a bottom surface of the one wing. The two second perforations of the two second bus-bars are corresponding to the two first perforations of the two mounting portions. The two second perforations of the two first bus-bars are corresponding to one positive electrode and one negative electrode of two batteries, respectively. The plurality of the detection lines are disposed on a top surface of the upper cover. One ends of the plurality of the detection lines are corresponding to the plurality of the fastening holes of the main portions of the plurality of the bus-bars. The one ends of the plurality of the detection lines are fastened to the plurality of the fastening holes of the main portions of the plurality of the bus-bars by the plurality of the insulating rivets. The plurality of the wirings are connected among the positive electrodes, the negative electrodes of the plurality of the batteries and the plurality of the bus-bars.

As described above, the two opposite sides of the upper part of the main portion extend downward to form the two hooking portions, respectively, the hooking portions of the plurality of the bus-bars are fastened in the location holes of the upper cover to realize that the plurality of the bus-bars are located in the location holes of the upper cover, and the plurality of the bus-bars are fastened in the location holes of the upper cover, and the one ends of the plurality of the detection lines are fastened to the plurality of the fastening holes of the main portions of the plurality of the bus-bars by the plurality of the insulating rivets, so that the battery module reduces a short circuit risk. Furthermore, the plurality of the wirings are used for connecting the positive electrode and the negative electrode of the plurality of the batteries to the plurality of the bus-bars by a wire-bonding technology. The wire-bonding technology not only reduces the short circuit risk, but also achieves a protection concept which is like the fuse, the wire-bonding technology is defined as a safety protection mechanism for an internal open circuit of each battery to improve an open circuit safety. As a result, the battery module is capable of reducing the short circuit risk and increasing the open circuit safety.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
FIG. 1 is a perspective view of a battery module in accordance with the present invention.
Figure 1:
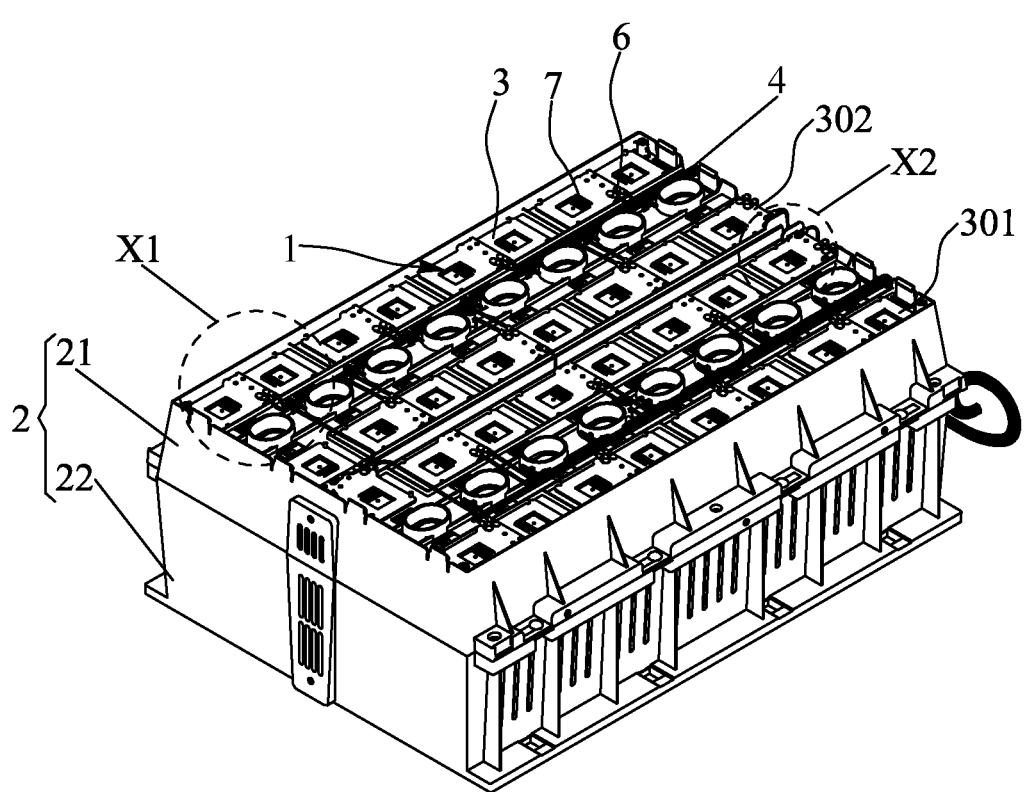
Figure 7:
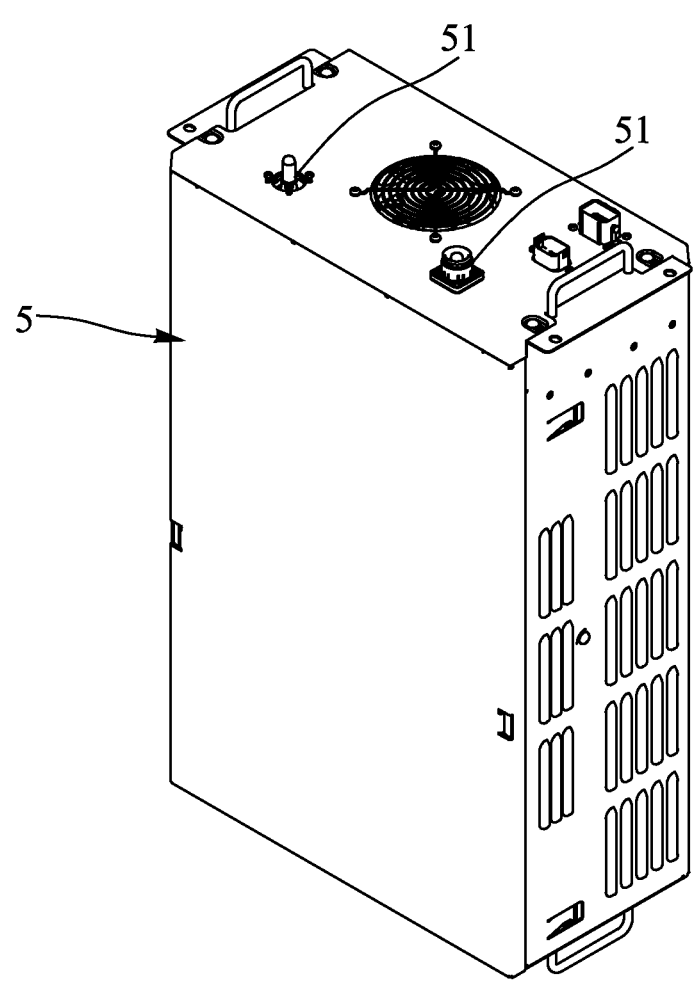
FIG. 7 is a perspective view of the energy storage system in accordance with the present invention, wherein the battery module is assembled in the energy storage system.
Figure 8:
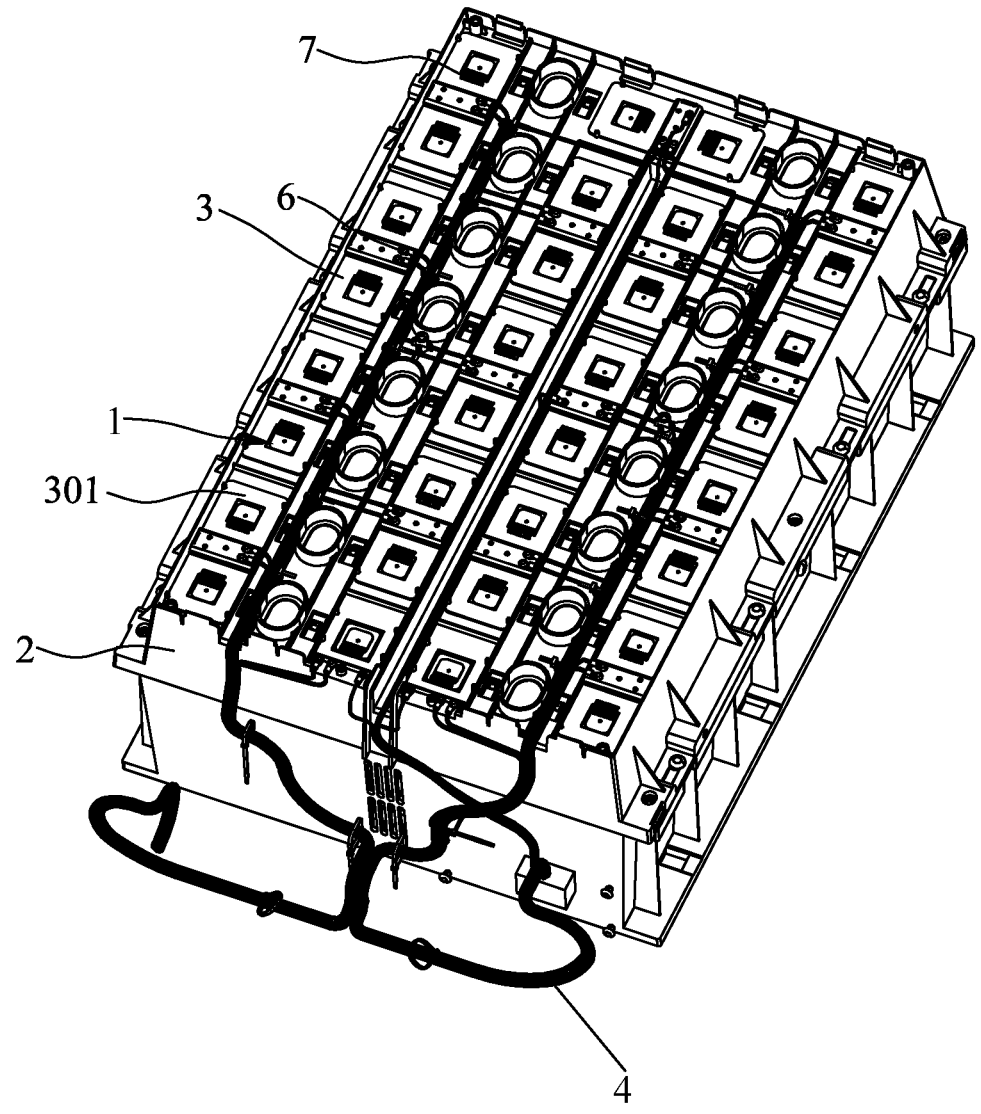
FIG. 8 is a partially assembled view of the battery module, wherein a plurality of first bus-bars are fastened to an upper cover of the battery module according to a first preferred embodiment of the present invention.
Figure 9:
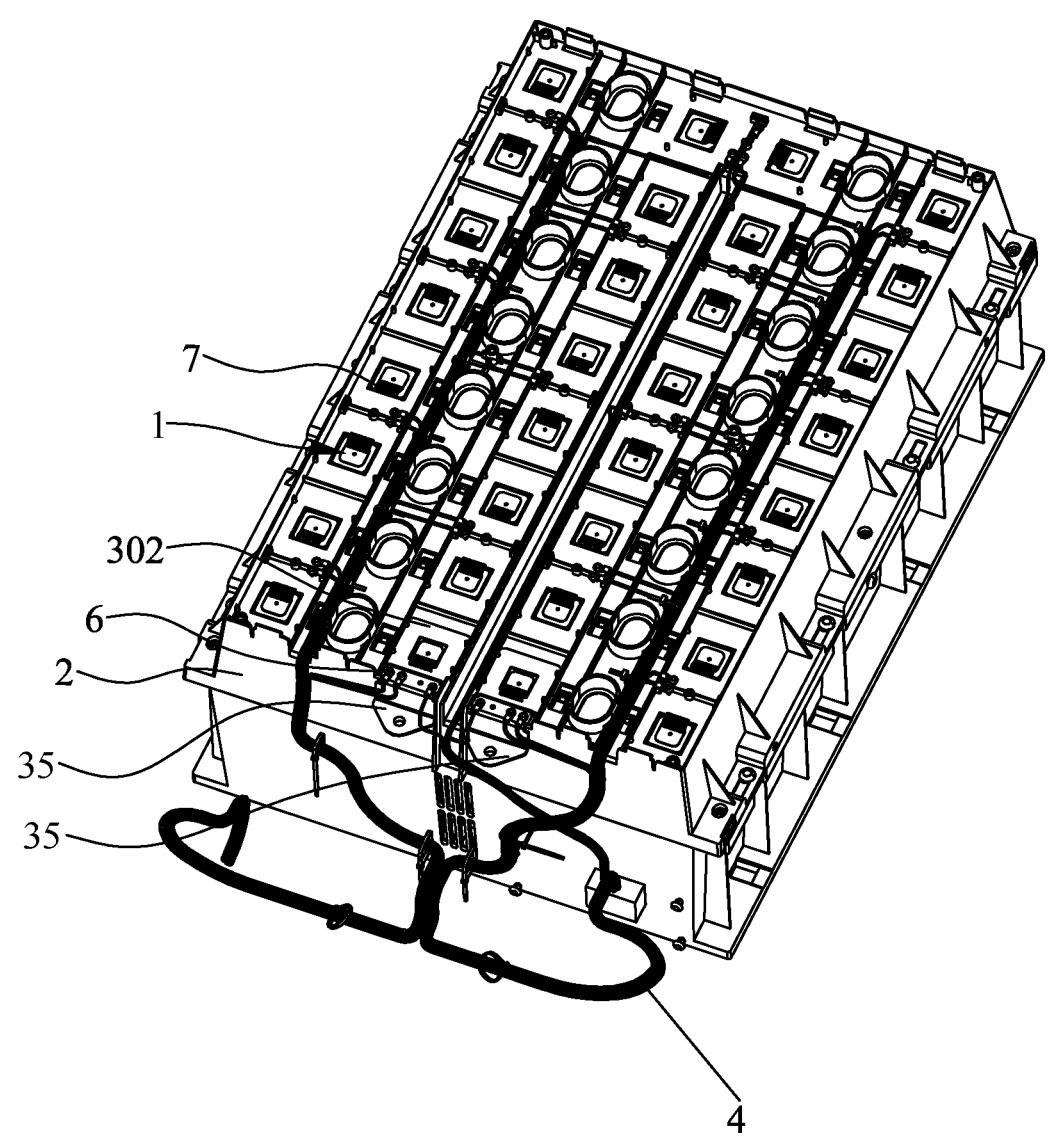
FIG. 9 is another partially assembled view of the battery module, wherein two second bus-bars are fastened to the upper cover of the battery module according to a second preferred embodiment of the present invention.
Figure 10:
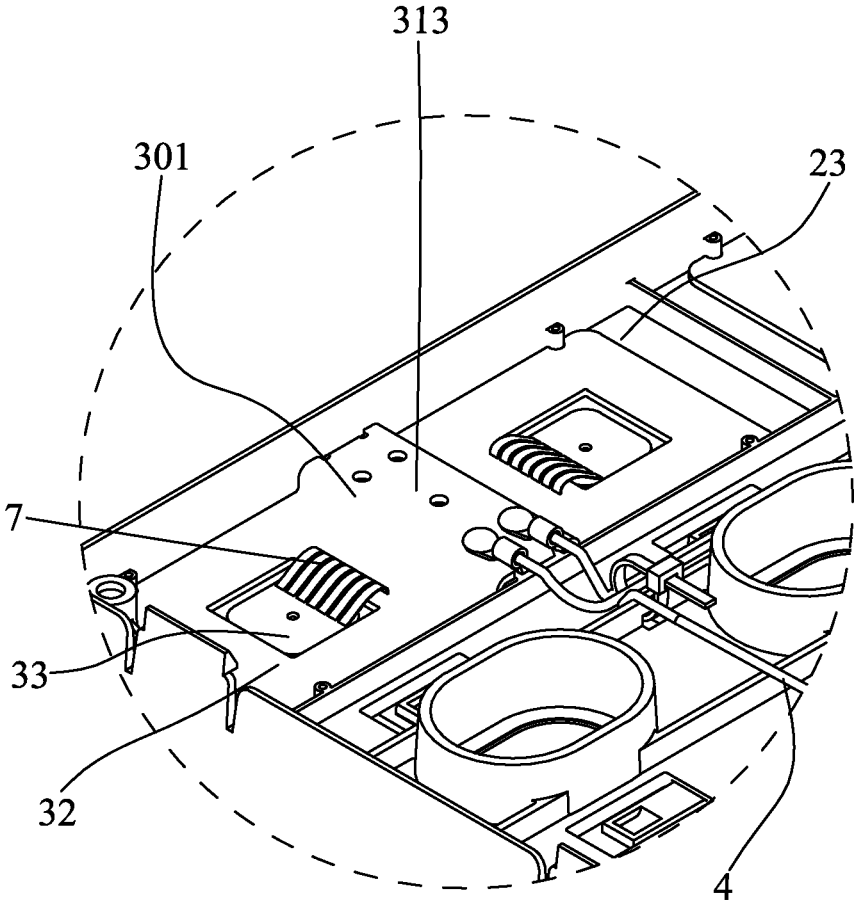
FIG. 10 is an enlarged view of an encircled portion X1 of the battery module of FIG. 1, wherein the plurality of the first bus-bars are fastened to the upper cover of the battery module according to the first preferred embodiment of the present invention.
Figure 11:
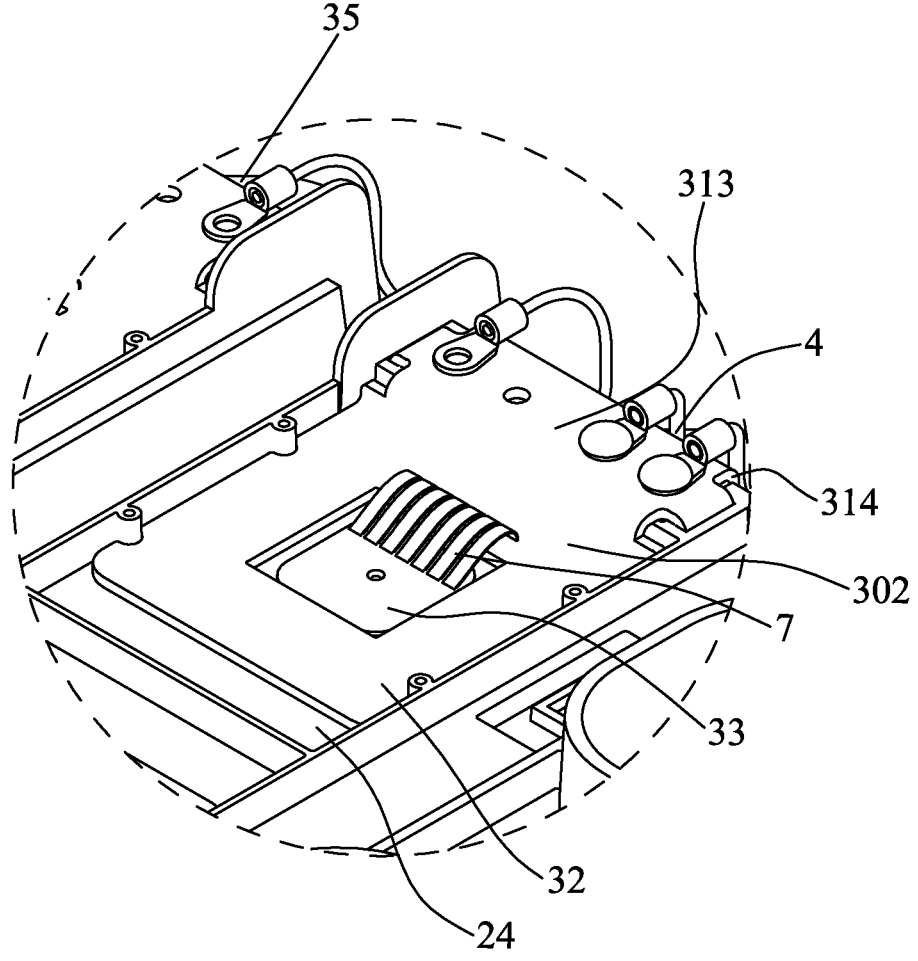
FIG. 11 is another enlarged view of an encircled portion X2 of the battery module of FIG. 1, wherein the two second bus-bars are fastened to the upper cover of the battery module according to the second preferred embodiment of the present invention.

With reference to FIG. 1 and FIG. 7, a battery module 100 in accordance with the present invention is shown. The battery module 100 is applied in an energy storage system 200. The energy storage system 200 includes a shell 5, and the battery module 100 assembled in the shell 5. The battery module 100 includes a plurality of batteries 1, a battery bracket 2, a plurality of bus-bars 3, a plurality of detection lines 4, a plurality of insulating rivets 6 and a plurality of wirings 7.

The plurality of the batteries 1 are fastened in the battery bracket 2. The plurality of the bus-bars 3 are disposed on a top surface of the battery bracket 2. The plurality of the bus-bars 3 are located to tops of the plurality of the batteries 1. The plurality of the bus-bars 3 are connected with the plurality of the batteries 1 in series or in parallel. The plurality of the bus-bars 3 are transversely arranged in four rows. Each row of the bus-bars 3 are arranged along a longitudinal direction. The plurality of the detection lines 4 are disposed on the top surface of the battery bracket 2. The plurality of the detection lines 4 are used for transmitting temperature detection signals and pressure detection signals of the plurality of the batteries 1. The plurality of the insulating rivets 6 are disposed to two sides of middles of the plurality of the bus-bars 3. The plurality of the detection lines 4 are disposed among the plurality of the insulating rivets 6. The plurality of the wirings 7 interconnect the plurality of the batteries 1 and the plurality of the bus-bars 3. The plurality of the wirings 7 are connected between the plurality of the batteries 1 and the plurality of the bus-bars 3. The shell 5 surrounds the plurality of the batteries 1, the battery bracket 2, the plurality of the bus-bars 3 and the plurality of the detection lines 4.

Figure 3:
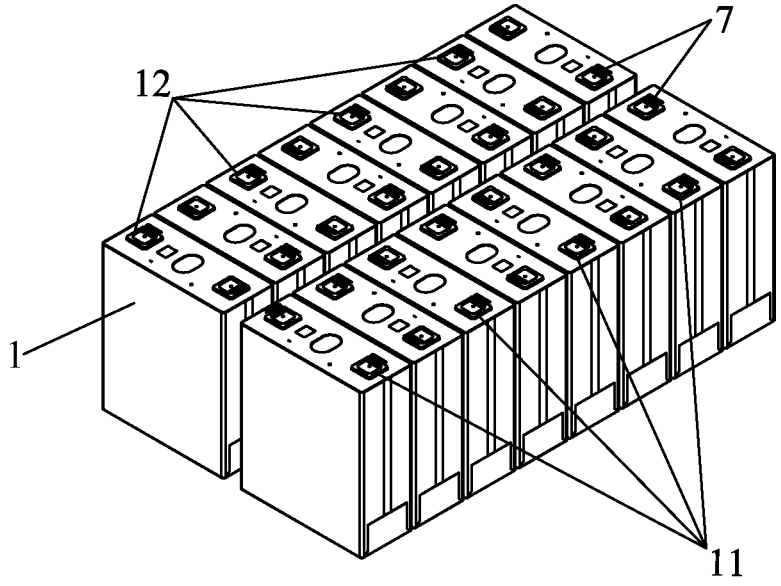
FIG. 3 is a perspective view of a plurality of batteries of the battery module of FIG. 1.
Figure 4:
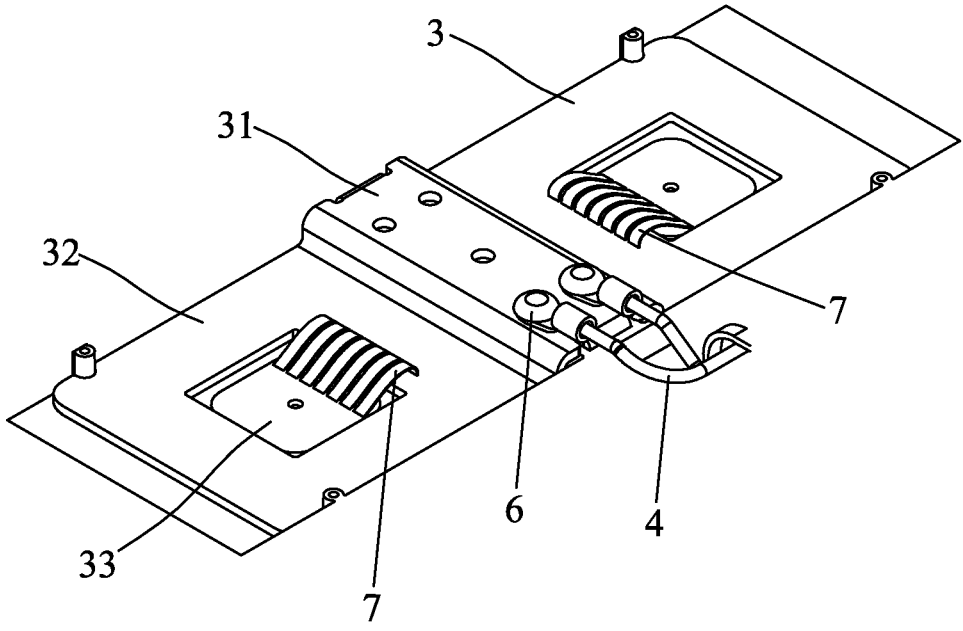
FIG. 4 is a partially assembled view of the battery module of FIG. 1.

Referring to FIG. 1 and FIG. 3, each battery 1 has a positive electrode 11 and a negative electrode 12. Two opposite sides of a top surface of each battery 1 are equipped with the positive electrode 11 and the negative electrode 12, respectively. Each two adjacent batteries 1 are arranged transversely, and each two adjacent batteries 1 are disposed opposite each other. In each two adjacent batteries 1, the positive electrode 11 of one battery 1 is opposite to the negative electrode 12 of the other battery 1, and the negative electrode 12 of the one battery 1 is opposite to the positive electrode 11 of the other battery 1, so the plurality of the bus-bars 3 are connected with the positive electrodes 11 and the negative electrodes 12 of the plurality of the batteries 1 to form the battery module 100. Specifically, the battery module 100 has sixteen batteries 1. The sixteen batteries 1 are transversely arranged in two rows. The battery module 100 has the two rows of the batteries 1. Each row of the batteries 1 has eight batteries 1 arranged along the longitudinal direction. The positive electrode 11 and the negative electrode 12 of each battery 1 are defined as electrodes.

Figure 2:
FIG. 2 is another perspective view of the battery module in accordance with the present invention.
Figure 2:
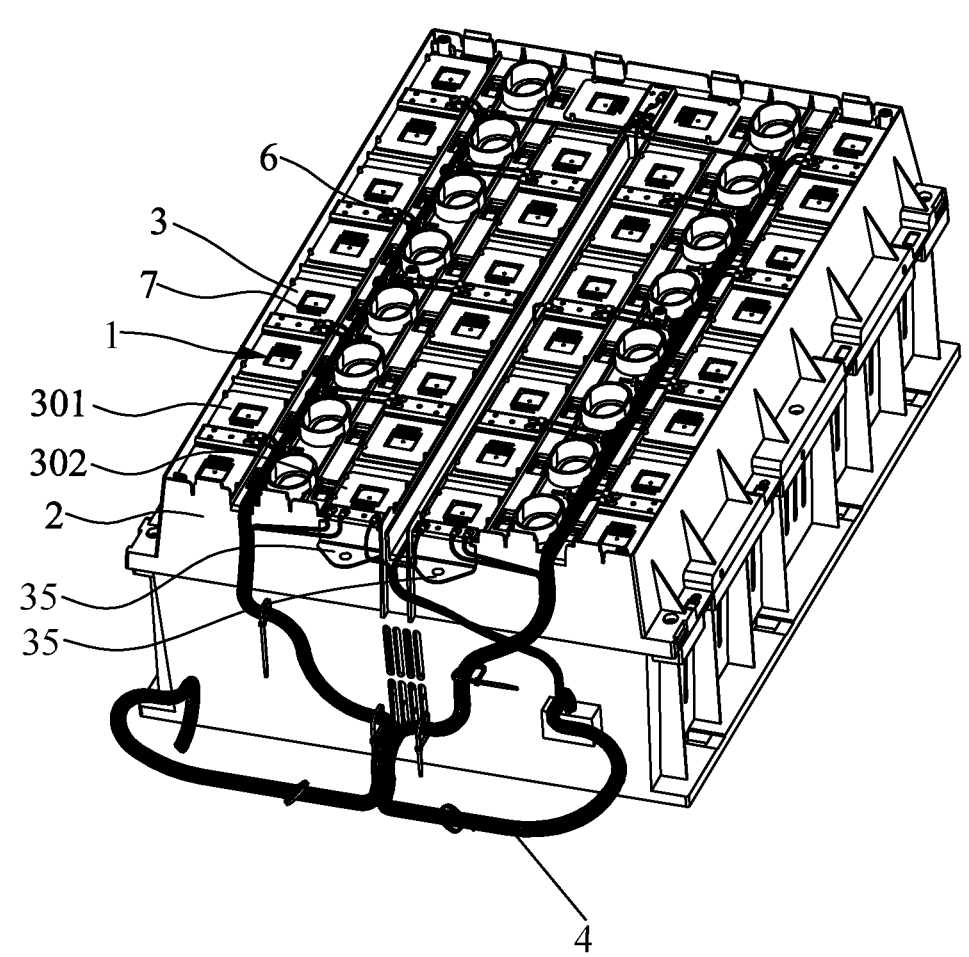
Figure 5:
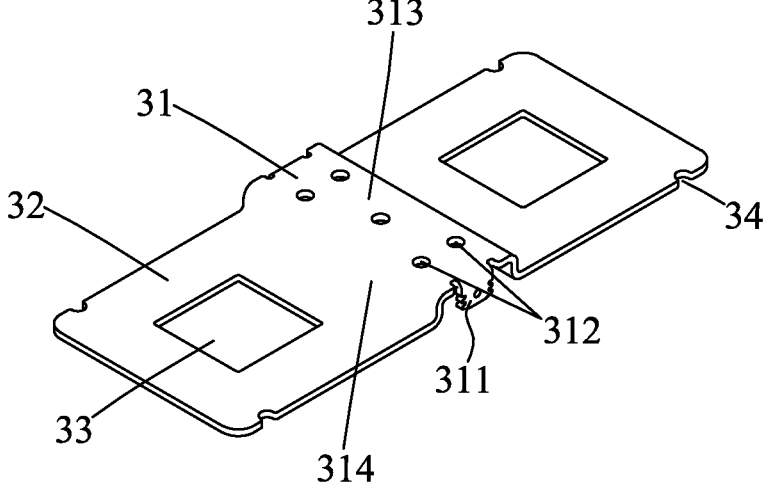
FIG. 5 is a partially exploded view of the battery module of FIG. 1.
Figure 5:
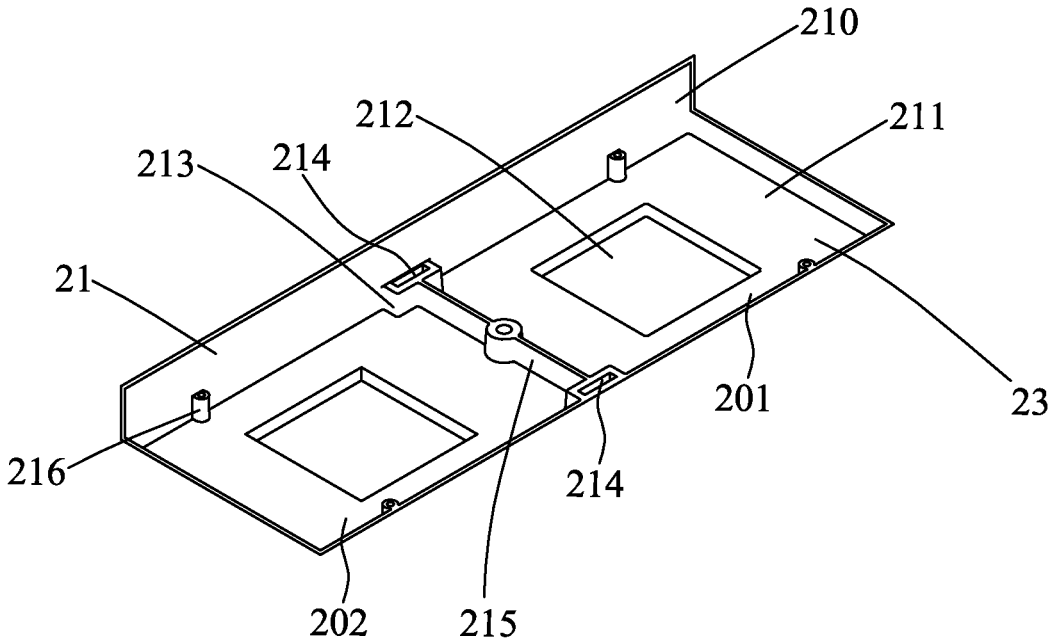
Figure 6:
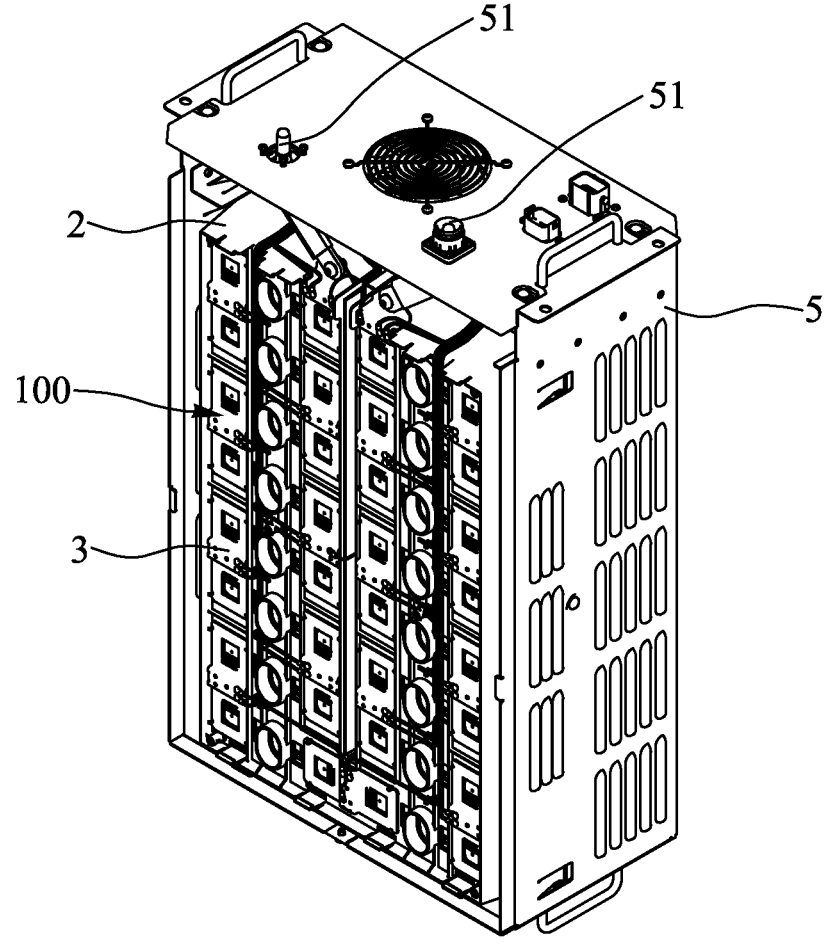
FIG. 6 is a partially perspective view of an energy storage system in accordance with the present invention, wherein the battery module is assembled in the energy storage system.

Referring to FIG. 1, FIG. 2 and FIG. 5, the battery bracket 2 includes an upper cover 21 and a lower cover 22. The upper cover 21 is covered on the plurality of the batteries 1. The plurality of the detection lines 4 are disposed on a top surface of the upper cover 21 of the battery bracket 2. The plurality of the batteries 1 are disposed between the upper cover 21 and the lower cover 22. The plurality of the bus-bars 3 are disposed on the top surface of the upper cover 21. A top of the upper cover 21 has a plurality of first mounting areas 23. The plurality of the first mounting areas 23 are arranged in four rows. Each row of the first mounting areas 23 are arranged along the longitudinal direction. Each bus-bar 3 is disposed on a top surface of one first mounting area 23. Each first mounting area 23 has four blocking walls 210, a mounting portion 211, two first perforations 212, two protrusions 213, two location holes 214, a rib 215 and a plurality of location feet 216. Two middles of two sides of the mounting portion 211 of each first mounting area 23 form the two location holes 214. The upper cover 21 has a plurality of the blocking walls 210, a plurality of the mounting portions 211, a plurality of the first perforations 212, a plurality of the protrusions 213, a plurality of the location holes 214, a plurality of the ribs 215 and the plurality of the location feet 216.

A periphery of a top surface of each first mounting area 23 protrudes upward to form the four blocking walls 210. The plurality of the blocking walls 210 surround the plurality of the mounting portions 211. The mounting portion 211 of each first mounting area 23 is surrounded by the four blocking walls 210. The plurality of the mounting portions 211 are surrounded among the plurality of the blocking walls 210. The mounting portion 211 of each first mounting area 23 is used for receiving one bus-bar 3. The plurality of the bus-bars 3 are disposed in the plurality of the mounting portions 211. The plurality of the detection lines 4 are divided into three groups. Each group of the detection lines 4 are disposed between the mounting portions 211 of two rows of the first mounting areas 23. The three groups of the detection lines 4 extend out of one end of the upper cover 21. Each mounting portion 211 has at least one first perforation 212 vertically penetrating through each mounting portion 211. The mounting portion 211 of each first mounting area 23 has the two first perforations 212. Each first perforation 212 penetrates through a top surface and a bottom surface of the mounting portion 211 of one first mounting area 23. The two first perforations 212 of each first mounting area 23 are corresponding to the positive electrode 11 and the negative electrode 12 of the one battery 1, respectively. The first perforations 212 of the plurality of the mounting portions 211 are corresponding to the positive electrodes 11 and the negative electrodes 12 of the plurality of the batteries 1.

Two lateral blocking walls 210 of each first mounting area 23 are opposite to each other. Two inner surfaces of the two lateral blocking walls 210 of each first mounting area 23 extend towards each other to form the two protrusions 213. Two sides of a top surface of each mounting portion 211 protrude upward to form the two protrusions 213. A top surface of each protrusion 213 is recessed inward to form the location hole 214. A middle of the top surface of each first mounting area 23 protrudes upward to form the rib 215. A middle of the top surface of each mounting portion 211 protrudes upward to form the rib 215. The rib 215 is transversely connected between the two protrusions 213. The rib 215 is located between the two protrusions 213. The mounting portion 211 of each first mounting area 23 is divided into a first mounting portion 201 and a second mounting portion 202 by the rib 215. A vertical height of the rib 215 and vertical heights of the two protrusions 213 of each first mounting area 23 are the same. Several portions of the top surface of each first mounting area 23 protrude upward to form the plurality of the location feet 216 connected with the two inner surfaces of the two lateral blocking walls 210.

Referring to FIG. 4, FIG. 5, FIG. 10 and FIG. 11, each bus-bar 3 is corresponding to the mounting portion 211 of one first mounting area 23 of the upper cover 21. Each bus-bar 3 is disposed on the mounting portion 211 of the one first mounting area 23 of the upper cover 21. A quantity of the plurality of the bus-bars 3 and a quantity of the plurality of the mounting portions 211 of the upper cover 2 are the same. Each bus-bar 3 has a main portion 31, a wing 32, a second perforation 33 and at least two recesses 34. The plurality of the bus-bars 3 include a plurality of first bus-bars 301 and two second bus-bars 302. The two second bus-bars 302 are located at two free ends of two middle rows of the bus-bars 3. Other bus-bars 3 are defined as the plurality of the first bus-bars 301.

Each first bus-bar 301 is fastened to the upper cover 2 in a first way which is according to a first preferred embodiment of the present invention. Each first bus-bar 301 has the main portion 31, two wings 32, two second perforations 33 and the plurality of the recesses 34. Each first bus-bar 301 is corresponding to the first mounting portion 201 and the second mounting portion 202 of the mounting portion 211. The plurality of the first bus-bars 301 are mounted in the plurality of the first mounting areas 23. The two second bus-bars 302 are located at a middle of a front end of the plurality of the bus-bars 3.

Two opposite ends of the main portion 31 oppositely extend outward to form the two wings 32. The two wings 32 are disposed in the first mounting portion 201 and the second mounting portion 202 of the mounting portion 211 of the one first mounting area 23, respectively. The two wings 32 define the two second perforations 33 penetrating through top surfaces and bottom surfaces of the two wings 32, respectively. The two second perforations 33 of each first bus-bar 301 are corresponding to the two first perforations 212 of the mounting portion 211 of the one first mounting area 23. The two second perforations 33 of each first bus-bar 301 are corresponding to the positive electrode 11 and the negative electrode 12 of the one battery 1, respectively. Two opposite sides of each wing 32 are recessed inward to form the two recesses 34. The plurality of the recesses 34 of the plurality of the bus-bars 3 are corresponding to the plurality of the location feet 216 of the upper cover 21 of the battery bracket 2. The location feet 216 of the upper cover 21 of the battery bracket 2 are buckled in the recesses 34 of the wings 32 of the plurality of the bus-bars 3, so that the plurality of the bus-bars 3 are located to the upper cover 21 of the battery bracket 2, and the plurality of the bus-bars 3 are fixed to the upper cover 21 of the battery bracket 2.

The main portion 31 has two hooking portions 311, a plurality of fastening holes 312, an upper part 313 and two side walls 314. Two opposite ends of the upper part 313 of the main portion 31 extend downward to form the two side walls 314, respectively. Two bottoms of the two side walls 314 extend outward to form the two wings 32, respectively. Two opposite sides of the upper part 313 of the main portion 31 extend downward to form the two hooking portions 311, respectively. The two hooking portions 311 are inserted into the two location holes 214 of the two protrusions 213. The hooking portions 311 of the plurality of the bus-bars 3 are fastened in the location holes 214 of the upper cover 21 to realize that the plurality of the bus-bars 3 are located in the location holes 214 of the upper cover 21 of the battery bracket 2, and the plurality of the bus-bars 3 are fastened in the location holes 214 of the upper cover 21 of the battery bracket 2. The main portions 31 of the plurality of the bus-bars 3 are disposed on the ribs 215 of the upper cover 21. Each bus-bar 3 is metallic. Each bus-bar 3 is made of a brass material. The upper cover 21 is plastic. The hooking portions 311 of the plurality of the bus-bars 3 are fastened in the location holes 214 of the upper cover 21 by a hot melt technology.

The battery module 100 is capable of reducing a short circuit risk and increasing an open circuit safety by a design of the hooking portions 311 of the plurality of the bus-bars 3. The upper part 313 of the main portion 31 defines the plurality of the fastening holes 312 penetrating through a top surface and a bottom surface of the upper part 313 of the main portion 31. One ends of the plurality of the detection lines 4 are corresponding to the plurality of the fastening holes 312 of the main portions 31 of the plurality of the bus-bars 3. The plurality of the insulating rivets 6 are corresponding to the fastening holes 312 of the main portions 31 of the plurality of the bus-bars 3. The plurality of the insulating rivets 6 are fastened in the one ends of the detection lines 4 and the fastening holes 312 of the main portions 31 of the plurality of the bus-bars 3. The one ends of the plurality of the detection lines 4 are fastened to the plurality of the fastening holes 312 of the main portions 31 of the plurality of the bus-bars 3 by the plurality of the insulating rivets 6. The plurality of the insulating rivets 6 are used for avoiding the short circuit risk more effectively. Each insulating rivet 6 has a better pull-out force. Each insulating rivet 6 is a plastic rivet. A thickness of the insulating rivet 6 is designed according to an application design value, so an assembling risk of the battery module 100 is lowered.

The plurality of the wirings 7 are connected among the positive electrodes 11, the negative electrodes 12 of the plurality of the batteries 1 and the plurality of the bus-bars 3. The plurality of the wirings 7 are exposed outside from the first perforations 212 of the plurality of the first mounting areas 23 of the upper cover 21 and the second perforations 33 of the plurality of the bus-bars 3. The plurality of the wirings 7 of each first bus-bar 301 are located close to two opposite ends of the main portion 31 of each first bus-bar 301. The plurality of the wirings 7 are used for connecting the positive electrodes 11 and the negative electrodes 12 of the plurality of the batteries 1 to the plurality of the bus-bars 3 by a wire-bonding technology. An application of the wire-bonding technology not only reduces the short circuit risk, but also achieves a protection concept which is like a fuse, a current upper limit is defined according to a need of a user, the wire-bonding technology is defined as a safety protection mechanism for an internal open circuit of each battery 1 to improve an open circuit safety.

The plurality of the wirings 7 are divided into thirty-two groups. Each group of the wirings 7 include seven wirings 7. A maximum resistance current value of each wiring 7 is 92.3 amperes, so a resistance current value of the group of the wirings 7 are 675 amperes in total. When a resistance current value of the group of the wirings 7 exceeds 675 amperes, the plurality of the wirings 7 are broken, serial connecting positions are automatically disconnected to increase a safety. In a concrete implementation, the resistance current value of each wiring 7 is without being limited. Each wiring 7 is an aluminum wire. A material of each wiring 7 is without being limited.

Referring to FIG. 1, FIG. 4, FIG. 6 and FIG. 7, the two second bus-bars 302 have two main portions 31, the two wings 32, the two second perforations 33, the plurality of the recesses 34 and two connecting portions 35. One end of the main portion 31 of each of the two second bus-bars 302 extends outward to form one wing 32. The other end of the main portion 31 of each of the two second bus-bars 302 extends outward to form one connecting portion 35. The two connecting portions 35 of the two second bus-bars 302 are electrically connected with two connectors 51 of the shell 5. The one wing 32 of each of the two second bus-bars 302 has one second perforation 33 penetrating through a top surface and a bottom surface of the one wing 32. Several portions of two opposite sides of the one wing 32 of each of the two second bus-bars 302 are recessed inward to form the a plurality of the recesses 34. Each connecting portion 35 is a triangle shape.

Referring to FIG. 1 to FIG. 11, each second bus-bar 302 is fastened to the upper cover 2 in a second way which is according to a second preferred embodiment of the present invention. A middle of one end of the top of the upper cover 21 has two second mounting areas 24. The plurality of the blocking walls 210 surround the plurality of the first mounting areas 23 and the two second mounting areas 24. The two second bus-bars 302 are disposed on top surfaces of the two second mounting areas 24, respectively. Each of the two second mounting areas 24 has three blocking walls 210, one mounting portion 211, one first perforation 212, the two protrusions 213, the two location holes 214, the rib 215 and the plurality of the location feet 216, so the upper cover 21 has the plurality of the blocking walls 210, and two mounting portions 211 surrounded among the plurality of the blocking walls 210. Two mounting portions 211 of the two second mounting areas 24 have the two first perforations 212 vertically penetrating through the two mounting portions 211. Each of the two second bus-bars 302 is corresponding to the one mounting portion 211 of each of the two second mounting areas 24. Each first mounting area 23 has the two first perforations 212 vertically penetrating through each first mounting area 23. Each second mounting area 24 has the one first perforation 212 vertically penetrating through each second mounting area 24. The first perforations 212 of the two second mounting areas 24 are corresponding to one positive electrode 11 and one negative electrode 12 of two batteries 1. The two second perforations 33 of each first bus-bar 301 are corresponding to the two first perforations 212 of the one first mounting area 23.

The two wings 32 of each first bus-bar 301 are disposed in the one first mounting area 23. Each of the two second bus-bars 302 is mounted in the one mounting portion 211 of each of the two second mounting areas 24. Each second bus-bar 302 has the one wing 32. The one wing 32 of each second bus-bar 302 has the one second perforation 33. The wing 32 of each of the two second bus-bars 302 is mounted in the one mounting portion 211 of each of the two second mounting areas 24. The plurality of the recesses 34 of the two second bus-bars 302 are corresponding to the plurality of the location feet 216 of the two second mounting areas 24 of the upper cover 21 of the battery bracket 2. The plurality of the location feet 216 of the two second mounting areas 24 are buckled in the plurality of the recesses 34 of the two second bus-bars 302 to realize that the two second bus-bars 302 are located to the battery bracket 2, and the two second bus-bars 302 are fixed to the battery bracket 2. The one second perforation 33 of each second bus-bar 302 is corresponding to the one first perforation 212 of the one second mounting area 24. The two second perforations 33 of the two second bus-bars 302 are corresponding to the two first perforations 212 of the two mounting portions 211 of the two second mounting areas 24. The two second perforations 33 of the two second bus-bars 302 are corresponding to the one positive electrode 11 and the one negative electrode 12 of the two batteries 1, respectively.

The main portion 31 of each of the two second bus-bars 302 has the two hooking portions 311, the plurality of the fastening holes 312, the upper part 313 and the two side walls 314. Two opposite ends of the upper part 313 extend downward to form the two side walls 314, respectively. A bottom of one side wall 314 extends outward to form the one wing 32. A bottom of the other side wall 314 extends downward and then is bent outward to form the connecting portion 35. The connecting portion 35 extends beyond a front end of the upper cover 21. Two opposite sides of the upper part 313 of the main portion 31 of each of the two second bus-bars 302 extend downward to form the two hooking portions 311, respectively. The two hooking portions 311 are fastened into the two location holes 214 of the two protrusions 213 of the upper cover 21 to realize that the two second bus-bars 302 are located to the upper cover 21 of the battery bracket 2, and the two second bus-bars 302 are fixed to the upper cover 21 of the battery bracket 2.

A top surface of each of the plurality of the first mounting areas 23 and the two second mounting areas 24 protrudes upward to form the rib 215. The main portion 31 of each of the two second bus-bars 302 is disposed on the rib 215 of the upper cover 21. The hooking portions 311 of the two second bus-bars 302 are fastened in the location holes 214 of the upper cover 21 by the hot melt technology. Each fastening hole 312 penetrates through the top surface and the bottom surface of the upper part 313 of the main portion 31 of one second bus-bar 302. The one ends of the plurality of the detection lines 4 are corresponding to the plurality of the fastening holes 312 of the main portions 31 of the plurality of the bus-bars 3. The plurality of the insulating rivets 6 are corresponding to the fastening holes 312 of the main portions 31 of the plurality of the bus-bars 3. The plurality of the insulating rivets 6 are fastened in the one ends of the detection lines 4 and the fastening holes 312 of the main portions 31 of the plurality of the bus-bars 3. The one ends of the plurality of the detection lines 4 are fastened to the plurality of the fastening holes 312 of the main portions 31 of the plurality of the first bus-bars 301 and the two second bus-bars 302 of the plurality of the bus-bars 3 by the plurality of the insulating rivets 6.

As described above, the two opposite sides of the upper part 313 of the main portion 31 extend downward to form the two hooking portions 311, respectively, the hooking portions 311 of the plurality of the bus-bars 3 are fastened in the location holes 214 of the upper cover 21 to realize that the plurality of the bus-bars 3 are located in the location holes 214 of the upper cover 21 of the battery bracket 2, and the plurality of the bus-bars 3 are fastened in the location holes 214 of the upper cover 21 of the battery bracket 2, and the one ends of the plurality of the detection lines 4 are fastened to the plurality of the fastening holes 312 of the main portions 31 of the plurality of the bus-bars 3 by the plurality of the insulating rivets 6, so that the battery module 100 reduces the short circuit risk. Furthermore, the plurality of the wirings 7 are used for connecting the positive electrodes 11 and the negative electrodes 12 of the plurality of the batteries 1 to the plurality of the bus-bars 3 by the wire-bonding technology. The wire-bonding technology not only reduces the short circuit risk, but also achieves the protection concept which is like the fuse, the wire-bonding technology is defined as the safety protection mechanism for the internal open circuit of each battery 1 to improve the open circuit safety. As a result, the battery module 100 is capable of reducing the short circuit risk and increasing the open circuit safety.

What is claimed is:

1. A battery module, comprising:
a plurality of batteries, each of the batteries having a positive electrode and a negative electrode;
an upper cover covered on the plurality of the batteries, a top of the upper cover having a plurality of first mounting areas, each first mounting area having a mounting portion between two lateral blocking walls opposite to each other, a middle of a top surface of the mounting portion protruding up and extending towards middles of the two lateral blocking walls to form a rib and two location holes respectively being formed between two ends of the rib and the middles of the two lateral blocking walls, the mounting portion having two first perforations respectively exposing one positive electrode and one negative electrode of the batteries;

a plurality of bus-bars, each bus-bar having a main portion with two opposite ends of an upper part of the main portion extending downward to form two hooking portions respectively and a plurality of fastening holes being formed on the upper part, the plurality of bus-bars including a plurality of first bus-bars mounted in the plurality of first mounting areas with the two hooking portions of each first sub-bar being respectively inserted into the two location holes of a corresponding first mounting area, each first bus-bar having two second perforations disposed above the two first perforations of the mounting portion of the corresponding first mounting area and further exposing the one positive electrode and the one negative electrode exposed by the mounting portion of the corresponding first mounting area;

a plurality of detection lines disposed on a top surface of the upper cover, one end of each of the plurality of the detection lines being corresponding to one of the plurality of the fastening holes of the main portions of the plurality of the bus-bars;

a plurality of insulating rivets, the one end of each of the plurality of the detection lines being fastened to a corresponding fastening hole by one of the plurality of the insulating rivets; and a plurality of wirings connected between the plurality of the batteries and the plurality of the bus-bars.

2. The battery module as claimed in claim 1, wherein the plurality of the wirings are used for connecting the positive electrodes and the negative electrodes of the plurality of the batteries to the plurality of the bus-bars by a wire-bonding technology.

3. The battery module as claimed in claim 1, wherein the plurality of the bus-bars are transversely arranged in four rows, each row of the bus-bars are arranged along a longitudinal direction, a middle of one end of the top of the upper cover has two second mounting areas, and the plurality of the bus-bars include two second bus-bars respectively disposed on top surfaces of the two second mounting areas and located at two free ends of two middle rows of the bus-bars.

4. The battery module as claimed in claim 1, wherein the upper part of the main portion of each first bus-bar has two opposite sides extending downward to form two side walls that further extend outward to form two wings with the two second perforations respectively penetrating through the two wings.

5. The battery module as claimed in claim 4, wherein two opposite sides of each wing are recessed inward to form two recesses, the upper cover has a plurality of blocking walls, the plurality of the mounting portions are surrounded among the plurality of the blocking walls, several portions of a top surface of each first mounting area protrude upward to form a plurality of location feet connected with two inner surfaces of the two lateral blocking walls, the plurality of the recesses of the plurality of the bus-bars are corresponding to the plurality of the location feet of the upper cover, and the location feet of the upper cover are buckled in the recesses of the wings of the plurality of the bus-bars.

6. The battery module as claimed in claim 5, wherein the two inner surfaces at the middles of the two lateral blocking walls of each first mounting area extend towards each other to form two protrusions with the rib being transversely connected to the two protrusions and the mounting portion being divided into a first mounting portion and a second mounting portion by the rib, and a top surface of each protrusion is recessed inward to form the location hole.

7. The battery module as claimed in claim 6, wherein a vertical height of the rib and vertical heights of the two protrusions of each first mounting area are the same.

8. The battery module as claimed in claim 4, wherein each of the two second bus-bars has two opposite sides extending outward to form one wing and one connecting portion respectively, the battery module includes a shell with two connectors electrically connected to the two connecting portions, each of the two second mounting areas has one mounting portion formed with one first perforation, the two first perforations of the two second mounting areas expose another positive electrode and another negative electrode of the batteries, each of the two second bus-bars has one second perforation penetrating through the one wing, and the two second perforations of the two second bus-bars are disposed above the two first perforations of two second mounting areas and further expose the another positive electrode and the another negative electrode exposed by the two first perforations of the two second mounting areas.

9. The battery module as claimed in claim 8, wherein each connecting portion is a triangle shape.

10. The battery module as claimed in claim 1, wherein each bus-bar is metallic.

11. The battery module as claimed in claim 1, wherein each bus-bar is made of a brass material, the upper cover is plastic, the hooking portions of the plurality of the bus-bars are fastened in the location holes of the upper cover by a hot melt technology.

12. The battery module as claimed in claim 1, wherein each insulating rivet is a plastic rivet.

13. A battery module, comprising:

a plurality of batteries, two opposite sides of a top surface of each battery being equipped with a positive electrode and a negative electrode, respectively;

an upper cover covered on the plurality of the batteries, the upper cover having a plurality of blocking walls surrounding a plurality of first mounting areas and two second mounting areas, each of the first mounting areas and the two second mounting areas having two lateral blocking walls opposite to each other, two inner surfaces of the two lateral blocking walls extending towards each other to form two protrusions, a top surface of each protrusion being recessed inward to form a location hole, each of the plurality of the first mounting areas and the two second mounting areas having a top surface protruding upward to form a rib transversely connected to the two protrusions with the two location holes disposed respectively between the rib and the two lateral blocking walls, each first mounting area having two first perforations respectively exposing one positive electrode and one negative electrode of the batteries, each second mounting area having one first perforation and the two first perforations of the two second mounting areas exposing another positive electrode and another negative electrode of the batteries;

a plurality of bus-bars including a plurality of first bus-bars disposed in the plurality of the first mounting areas and two second bus-bars disposed in the two second mounting areas, each bus-bar having a main portion and a plurality of fastening holes penetrating through an upper part of the main portion, two opposite ends of the upper part extending downward to form two hooking portions respectively inserted into the two location holes of the two protrusions of a corresponding first or second mounting area, the upper part of the main portion of each first bus-bar having two opposite sides extending down and then outward to form two wings with two second perforations respectively penetrating through the two wings, the two second perforations being disposed above the two first perforations of the corresponding first mounting area and further exposing the one positive electrode and the one negative electrode exposed by two first perforations of the corresponding first mounting area, the two second bus-bars being located at a middle of a front end of the plurality of the bus-bars, the upper part of the main portion of each second bus-bar having one side extended to form one wing with one second perforation penetrating through the one wing, and the two second perforations of the two second bus-bars being disposed above the two first perforations of the two second mounting areas and further exposing the another positive electrode and the another negative electrode exposed by the two first perforations of the two second mounting areas;

a plurality of detection lines disposed on a top surface of the upper cover, one end of each of the plurality of the detection lines being corresponding to one of the plurality of the fastening holes of the main portions of the plurality of the bus-bars;

a plurality of insulating rivets, the one end of each of the plurality of the detection lines being fastened to a corresponding fastening hole by one of the plurality of the insulating rivets; and a plurality of wirings connected among the positive electrodes, the negative electrodes of the plurality of the batteries and the plurality of the bus-bars.

14. A battery module assembled in a shell, comprising:

a plurality of batteries, two opposite sides of a top surface of each battery being equipped with a positive electrode and a negative electrode, respectively;

an upper cover covered on the plurality of the batteries, the upper cover having a plurality of blocking walls surrounding a plurality of mounting portions, each mounting portion having at least one first perforation and two lateral blocking walls opposite to each other, two inner surfaces of the two lateral blocking walls extending towards each other to form two protrusions, a middle of a top surface of the mounting portion protruding upward to form a rib transversely connected to the two protrusions, two location holes respectively formed in the two protrusions and disposed between the rib and the two lateral blocking walls, the first perforations of the plurality of the mounting portions exposing the positive electrodes and the negative electrodes of the plurality of the batteries;

a plurality of bus-bars disposed in the plurality of the mounting portions, each bus-bar having a main portion, the plurality of the bus-bars including a plurality of first bus-bars and two second bus-bars, the main portion of each second bus-bar having a plurality of fastening holes penetrating through an upper part of the main portion and two sides of the main portion extending outward to respectively form one wing mounted in a corresponding mounting portion and one connecting portion extending beyond a front end of the upper cover, two opposite ends of the upper part extending downward to form two hooking portions respectively inserted into the two location holes of the two protrusions of the corresponding mounting portion, the two connecting portions of the two second bus-bars being electrically connected with two connectors of the shell, the one wing of each second bus-bar having one second perforation penetrating through the one wing, the two second bus-bars being located at a middle of a front end of the plurality of the bus-bars with the two second perforations of the two second bus-bars being disposed respectively above the first perforations of two corresponding mounting portions and further exposing the positive electrode and the negative electrode exposed by the first perforations of the two corresponding mounting portions;

a plurality of detection lines disposed on a top surface of the upper cover, one end of each of the plurality of the detection lines being corresponding to one of the plurality of the fastening holes of the main portions of the plurality of the bus-bars;

a plurality of insulating rivets, the one end of each the plurality of the detection lines being fastened to a corresponding fastening hole by one of the plurality of the insulating rivets; and a plurality of wirings connected among the positive electrodes, the negative electrodes of the plurality of the batteries and the plurality of the bus-bars.

* * * * *